United States Patent
Jöngren et al.

(10) Patent No.: US 8,705,575 B2
(45) Date of Patent: Apr. 22, 2014

(54) METHODS AND ARRANGEMENTS IN A WIRELESS COMMUNICATION SYSTEM USING MULTI-CODEWORD TRANSMISSION AND ACK/NACK COMPRESSION

(75) Inventors: George Jöngren, Stockholm (SE); David Astely, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 335 days.

(21) Appl. No.: 12/999,863

(22) PCT Filed: Apr. 14, 2009

(86) PCT No.: PCT/SE2009/050381
§ 371 (c)(1),
(2), (4) Date: Dec. 17, 2010

(87) PCT Pub. No.: WO2010/002319
PCT Pub. Date: Jan. 7, 2010

(65) Prior Publication Data
US 2011/0122819 A1 May 26, 2011

Related U.S. Application Data

(60) Provisional application No. 61/078,012, filed on Jul. 3, 2008.

(51) Int. Cl.
*H04L 27/28* (2006.01)
(52) U.S. Cl.
USPC ........................................................ 370/479
(58) Field of Classification Search
USPC ......... 370/278, 280, 315, 328, 329, 338, 342, 370/260, 335; 375/342, 259, 260, 261, 299; 455/500, 522; 714/746, 748, 751, 752, 714/776, 800
See application file for complete search history.

(56) References Cited

U.S. PATENT DOCUMENTS

| 7,693,125 B2 * | 4/2010 | Ihm et al. | 370/343 |
| 8,005,027 B2 * | 8/2011 | Ye et al. | 370/278 |

(Continued)

FOREIGN PATENT DOCUMENTS

| EP | 1211840 A1 * | 6/2002 | H04L 1/18 |
| JP | 2007-116637 A | 5/2007 | |

(Continued)

OTHER PUBLICATIONS

International Search Report, PCT Application No. PCT/SE2009/050381, Jul. 8, 2010.

(Continued)

*Primary Examiner* — Chirag Shah
*Assistant Examiner* — Jael Ulysse
(74) *Attorney, Agent, or Firm* — Myers Bigel Sibley & Sajovec, P.A.

(57) ABSTRACT

The present invention relates to methods and arrangements in a wireless communication system that enable the use of multi-codeword transmission and ACK/NACK compression with low performance loss. It also enables the use of advanced receivers of reasonable complexity. This is achieved by a solution based on the even distribution of the symbols of separately coded blocks of information bits over the available physical resources before transmission. Each physical resource will thus carry a mixture of symbols from all blocks of information bits, which results in a more similar channel quality for the blocks of information bits. A compressed ACK/NACK message corresponding to the blocks of information bits will thus be more accurate and the performance loss due to the ACK/NACK compression can be reduced.

28 Claims, 8 Drawing Sheets

(56) References Cited

U.S. PATENT DOCUMENTS

| | | | |
|---|---|---|---|
| 8,194,601 B2* | 6/2012 | Han et al. | 370/329 |
| 8,351,524 B2* | 1/2013 | Zhou | 375/260 |
| 2003/0095532 A1* | 5/2003 | Kim et al. | 370/342 |
| 2005/0201325 A1* | 9/2005 | Kang et al. | 370/328 |
| 2006/0018259 A1* | 1/2006 | Kadous | 370/236 |
| 2006/0165189 A1* | 7/2006 | Tamaki et al. | 375/260 |
| 2006/0195767 A1* | 8/2006 | Ihm et al. | 714/776 |
| 2006/0274836 A1* | 12/2006 | Sampath et al. | 375/242 |
| 2007/0011550 A1* | 1/2007 | Agrawal et al. | 714/746 |
| 2007/0092020 A1* | 4/2007 | Seki | 375/267 |
| 2008/0049692 A1* | 2/2008 | Bachu et al. | 370/338 |
| 2008/0069074 A1* | 3/2008 | Shin et al. | 370/342 |
| 2008/0086669 A1* | 4/2008 | Cheng et al. | 714/748 |
| 2008/0144561 A1* | 6/2008 | Kaikkonen et al. | 370/315 |
| 2008/0165873 A1* | 7/2008 | Ghosh et al. | 375/261 |
| 2008/0175195 A1* | 7/2008 | Cho et al. | 370/329 |
| 2008/0186934 A1* | 8/2008 | Khan et al. | 370/342 |
| 2008/0192718 A1* | 8/2008 | Jongren et al. | 370/342 |
| 2008/0267158 A1* | 10/2008 | Zhang et al. | 370/342 |
| 2008/0294967 A1* | 11/2008 | Tomlinson et al. | 714/800 |
| 2009/0016265 A1* | 1/2009 | Katayama et al. | 370/328 |
| 2009/0046805 A1* | 2/2009 | Kim et al. | 375/295 |
| 2009/0110114 A1* | 4/2009 | Onggosanusi et al. | 375/299 |
| 2009/0135965 A1* | 5/2009 | Shen et al. | 375/341 |
| 2009/0175214 A1* | 7/2009 | Sfar et al. | 370/315 |
| 2009/0175243 A1* | 7/2009 | Han et al. | 370/335 |
| 2009/0197630 A1* | 8/2009 | Ahn et al. | 455/522 |
| 2009/0235140 A1* | 9/2009 | Yue et al. | 714/751 |
| 2009/0274109 A1* | 11/2009 | Zhang et al. | 370/329 |
| 2009/0304109 A1* | 12/2009 | Kotecha | 375/299 |
| 2010/0023834 A1* | 1/2010 | Richardson et al. | 714/751 |
| 2010/0050034 A1* | 2/2010 | Che et al. | 714/748 |
| 2010/0138719 A1* | 6/2010 | Lee et al. | 714/752 |
| 2010/0173659 A1* | 7/2010 | Shin et al. | 455/500 |
| 2010/0195594 A1* | 8/2010 | Seo et al. | 370/329 |
| 2010/0254483 A1* | 10/2010 | Chun et al. | 375/295 |
| 2010/0265898 A1* | 10/2010 | Chun et al. | 370/329 |
| 2011/0051824 A1* | 3/2011 | Kim et al. | 375/259 |
| 2011/0154144 A1* | 6/2011 | Nanda | 714/748 |
| 2012/0269295 A9* | 10/2012 | Ko et al. | 375/299 |
| 2012/0294207 A1* | 11/2012 | Ahn et al. | 370/280 |

FOREIGN PATENT DOCUMENTS

| | | | |
|---|---|---|---|
| JP | 2008-516529 A | 5/2008 | |
| WO | WO 2006/041891 A2 | 4/2006 | |
| WO | WO 2006/041891 A3 | 4/2006 | |
| WO | WO 2006041891 A2 * | 4/2006 | |
| WO | WO 2006/130541 A2 * | 12/2006 | H04B 7/06 |
| WO | WO 2007/145492 A2 | 12/2007 | |
| WO | WO 2008/062587 A1 | 5/2008 | |

OTHER PUBLICATIONS

Written Opinion of the International Searching Authority, PCT Application No. PCT/SE2009/050381, Jul. 8, 2010.

International Preliminary Report on Patentability, PCT Application No. PCT/SE2009/050381, Nov. 19, 2010.

3GPP TS 36.211, V8.3.0, (May 2008), 3$^{rd}$ Generation Partnership Project; Technical Specification Group Radio Access Network; Evolved Universal Terrestrial radio Access (E-UTRA); Physical Channels and Modulation (Release 8), 6 pages.

Higuchi Ken-ichi et al. Consideration on MIMO Precoding Scheme Using Cyclic Delay Diversity on Evolved UTRA Downlink, IEICE ( Institute of Information and Communication Engineers) communication society meeting proceedings #1, Aug. 29, 2007, p. 351, B-5-29, Japanese language only.

InterDigital Communications Corporation, "Comparison of SCW and MCW fro UL MIMO Using Precoding", 3GPP TSG-RAN WG1 Meeting #46, Tallinn, Estonia, R1-062159, Aug. 28-Sep. 1, 2006, 7 Pages.

Japanese Office Action Corresponding to Japanese Patent Application No. JP 2011-516214; Dispatch Date: Jul. 30, 2013; 2 Pages.

Qualcomm Europe, "MIMO proposal for MIMO-WCDMA evaluation", 3GPP TSG-RAN WG1 #42, London, United Kingdom, R1-050912, Aug. 29-Sep. 2, 2005, 21 Pages.

* cited by examiner

METHODS AND ARRANGEMENTS IN A WIRELESS COMMUNICATION SYSTEM USING MULTI-CODEWORD TRANSMISSION AND ACK/NACK COMPRESSION

CROSS REFERENCE TO RELATED APPLICATION

This application is a 35 U.S.C. §371 national stage application of PCT International Application No. PCT/SE2009/050381, filed on 14 Apr. 2009, which itself claims priority to U.S. Provisional Patent Application No. 61/078,012, filed 3 Jul. 2008, the disclosure and content of both of which are incorporated by reference herein in their entirety. The above-referenced PCT International Application was published in the English language as International Publication No. WO 2010/002319 A3 on 7 Jan. 2010.

TECHNICAL FIELD

The present invention relates to multi-codeword transmission in a wireless communication system. More particularly, the present invention relates to methods and to transmitting and receiving devices, adapted to transmit and receive multiple blocks of information bits with HARQ over a radio channel comprising at least two physical resources.

BACKGROUND

Figure 1:
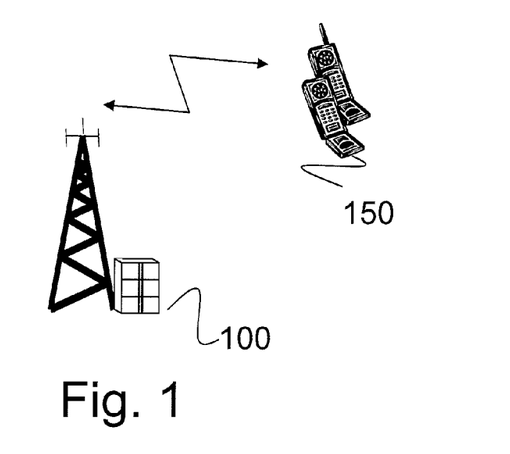
FIG. 1 illustrates schematically a part of a conventional wireless communication system wherein the present invention may be implemented.

The Universal Mobile Telecommunication System (UMTS) is one of the third generation mobile communication technologies designed to succeed GSM. 3GPP Long Term Evolution (LTE) is a project within the $3^{rd}$ Generation Partnership Project (3GPP) to improve the UMTS standard to cope with future requirements in terms of improved services such as higher data rates, improved efficiency, lowered costs etc. UMTS Terrestrial Radio Access Network (UTRAN) is the radio access network of a UMTS system and evolved UTRAN (E-UTRAN) is the radio access network of an LTE system. As illustrated in FIG. 1, an E-UTRAN typically comprises user equipment (UE) 150 wirelessly connected to a radio base station (RBS) 100, commonly referred to as an eNodeB.

Modern wireless communication systems targeted for packet based communication often include hybrid automatic repeat request (HARQ) functionality on the physical layer to achieve robustness against the impairments of the radio channel. LTE and UMTS are two examples of systems in which such functionality is available. The basic idea behind HARQ is to combine forward error correction (FEC) with automatic repeat request (ARQ). In FEC coding, redundancy is introduced in the transmitted block of information bits. Parity bits are added to the information bits prior to the transmission, and the parity bits are computed from the information bits using a method given by the coding structure used. On the receiving side, errors introduced during transmission of the information bits may be corrected when decoding. In an ARQ scheme, the receiver uses an error-detecting code to detect if the received block of information bits is in error or not. If no error is detected, a positive acknowledgement (ACK) is sent to the transmitter, and if an error is detected, a negative acknowledgement (NACK) is sent. After a NACK, the transmitter will retransmit the same information again. In HARQ—being a combination of FEC and ARQ—the block of information bits (also known as a transport block (TPB)) is encoded and an error-detection code, such as cyclic redundancy check (CRC), is added to the block. After reception of the coded block, it is decoded and the error-detection code is used to check whether the decoding was successful or not. If the block of information was received without errors, an ACK is sent to the transmitter indicating that the transmission was successful and that the receiver is ready for a new block. On the other hand, if the block of information bits was not decoded correctly, a NACK is sent to the transmitter meaning that the receiver expects a retransmission of the same block. A further improvement is to combine the retransmissions with soft-combining functionality, where the receiver does not discard erroneously received blocks of information bits but buffers their soft-bit values and combines these values with the soft-bit values of the retransmitted blocks. This is often referred to as HARQ with soft combining.

The coded bits originating from a same block of information bits are referred to as a codeword. This is the terminology used in LTE to describe the output from a single HARQ process (comprising turbo encoding, rate matching, interleaving etc.) serving a particular TPB. The same TPB generates different codewords for each HARQ retransmission.

Multi-antenna techniques can significantly increase the data rates and reliability of a wireless communication system. The performance is in particular improved if both the transmitter and the receiver are equipped with multiple antennas. This results in a multiple-input multiple-output (MIMO) radio communication channel and such systems and related techniques are commonly referred to as MIMO. Several wireless standards nowadays support MIMO antenna deployments and MIMO related techniques such as spatial multiplexing, beam-forming and diversity.

In the general case, a multi-antenna configuration will consist of $N_T$ transmit antennas and $N_R$ receive antennas. Under certain conditions, it is possible to create up to $N_L = \min\{N_T, N_R\}$ parallel "channels", also called layers. Another commonly used term for layer is symbol stream. The signal on each layer will have a lower signal-to-noise ratio as the signal power is split between the layers. On the other hand, data can now be transmitted in parallel on the involved layers. The channel capacity can thus under favorable channel conditions grow essentially linearly with the number of antennas. This technique of exploiting the spatial dimension to simultaneously transmit on several layers is referred to as spatial multiplexing.

As mentioned above, the number of parallel signals that can be spatially multiplexed is upper limited by $N_L = \min\{N_T, N_R\}$. However, in many cases, the number of spatially multiplexed signals will be less than $N_L$. In case of very bad channel conditions e.g., there is no gain of spatial multiplexing, and the multiple antennas should be used to improve the signal-to-noise ratio with beam-forming instead of using them for spatial multiplexing.

The use of spatial multiplexing aims at high data rates in favourable channel conditions, and spatial multiplexing is combined with either channel dependent or channel independent pre-coding. The pre-coding serves two purposes. When the number of signals to be spatially multiplexed equals the number of transmit antennas ($N_L = N_T$), the pre-coding can be used to orthogonalize the parallel transmissions, allowing for improved signal isolation at the receiver side through reduced inter-layer interference. When the number of signals to be spatially multiplexed is less than the number of transmit antennas ($N_L < N_T$), the pre-coding in addition provides the mapping of the $N_L$ spatially multiplexed signals to the $N_T$ transmit antennas.

Figure 2:
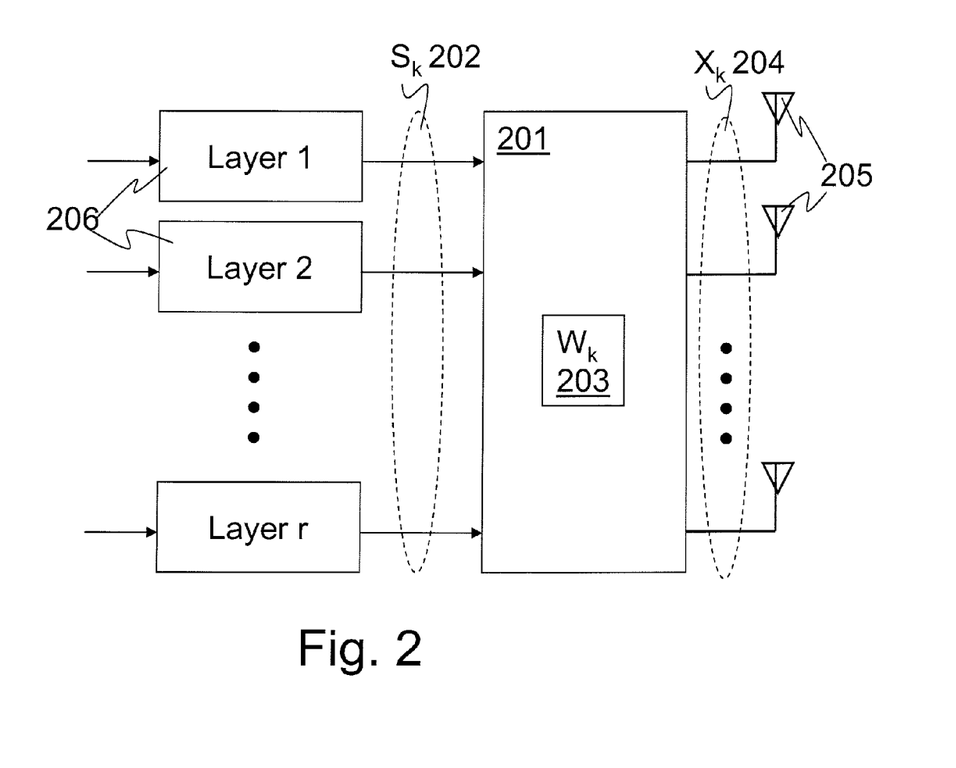
FIG. 2 illustrates schematically the structure of a conventional transmitter employing pre-coded spatial multiplexing.

An illustration of the structure of a transmitter employing pre-coded spatial multiplexing is provided in FIG. 2. As seen, a sequence of information carrying symbol vectors $s_k$ 202 is input to the pre-coder 201. k is an index pointing out the resource element corresponding to a channel use. A resource element may for example be a time interval, a window that spans time and/or frequency, or a spreading code depending on the radio technology used. The r symbols in $s_k$ 202 each belong to a specific layer 206 and r thus equals the number of layers and is referred to as the transmission rank. Each symbol vector 202 is multiplied by an $N_T \times r$ pre-coder matrix $W_k$ 203 to produce the corresponding pre-coded vector $x_k$ 204, which is then transmitted over the radio channel via the $N_T$ antenna ports 205. The pre-coded vector $x_k$ 204, transmitted over resource element k can thus be written as $$x_k = \begin{bmatrix} x_k^{(1)} \\ x_k^{(2)} \\ \vdots \\ x_k^{(N_T)} \end{bmatrix} = \begin{bmatrix} W_k^{(11)} & W_k^{(12)} & \cdots & W_k^{(1r)} \\ W_k^{(21)} & W_k^{(22)} & \cdots & W_k^{(2r)} \\ \vdots & \vdots & \ddots & \vdots \\ W_k^{(N_T 1)} & W_k^{(N_T 2)} & \cdots & W_k^{(N_T r)} \end{bmatrix} \begin{bmatrix} s_1^{(1)} \\ s_1^{(2)} \\ \vdots \\ s_1^{(r)} \end{bmatrix} = W_k s_k \quad (1)$$

The pre-coder matrix is often chosen to match the characteristics of the $N_R \times N_T$ MIMO channel $H_k$, resulting in so-called channel dependent pre-coding. The receiver estimates the channel and decides on a suitable pre-coding matrix from the code-book containing the set of available pre-coding matrices, and feeds back the information about the selected pre-coding matrix to the transmitter. For Frequency Division Duplex (FDD), channel dependent pre-coding is also commonly referred to as closed-loop pre-coding. The purpose of closed-loop pre-coding is to focus the transmit energy into a subspace in order to convey a large portion of the transmitted energy to the UE. In some cases, for example in the case of very high transmission rates, channel independent pre-coding is used instead as it is not possible to adapt the pre-coder matrix to the channel matrix fast enough.

As the pre-coder matrix in practice never will perfectly match the channel matrix for channel dependent pre-coding, there will always be some residual interference between the spatially multiplexed signals. This interference can be taken care of by means of non-linear receiver processing, such as successive interference cancellation (SIC). SIC is based on an assumption that the spatially multiplexed signals are separately coded before the spatial multiplexing (often referred to as multi-codeword transmission). With SIC, the receiver first demodulates and decodes one of the spatially multiplexed signals. The corresponding decoded data is then, if correctly decoded, re-encoded and subtracted from the received signals. A second spatially multiplexed signal can then be demodulated and decoded without any interference from the first signal, i.e. with an improved signal-to-noise ratio. The decoded data from the second signal is then, if correctly decoded, re-encoded and subtracted from the received signals before decoding of a third signal. These iterations continue until all spatially multiplexed signals have been demodulated and decoded.

Figure 3A:
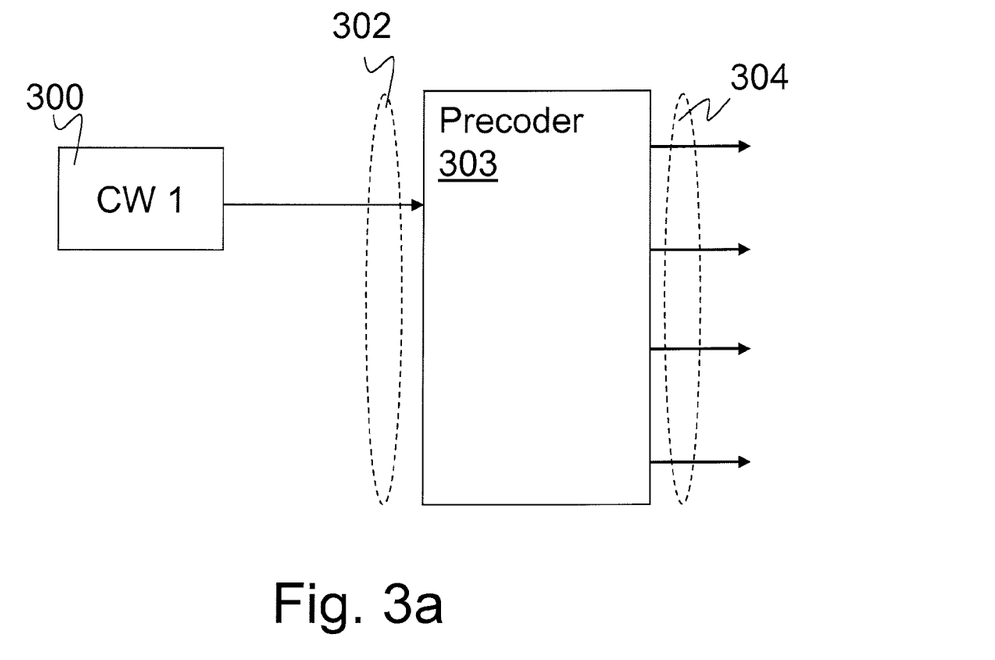
FIGS. 3a-d illustrate schematically the conventional codeword to layer mapping in the downlink of E-UTRAN with four transmitting antennas for the cases of one, two, three and four layers respectively.
Figure 3B:
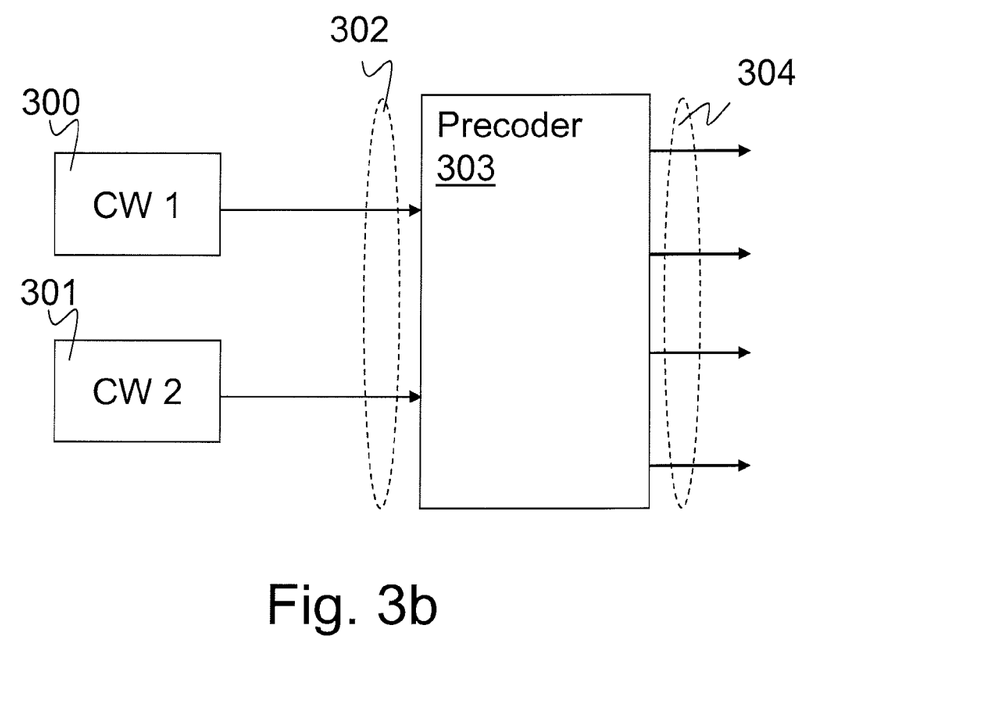
Figure 3C:
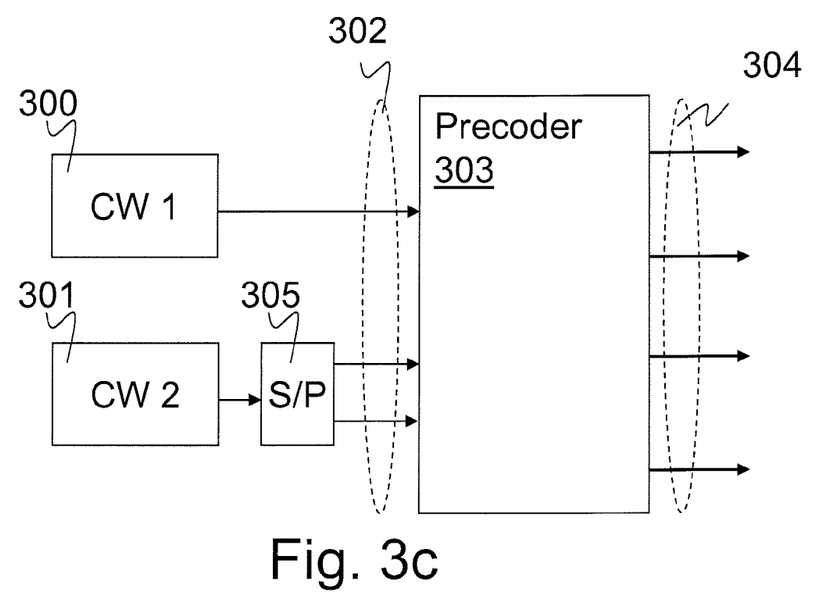
Figure 3D:
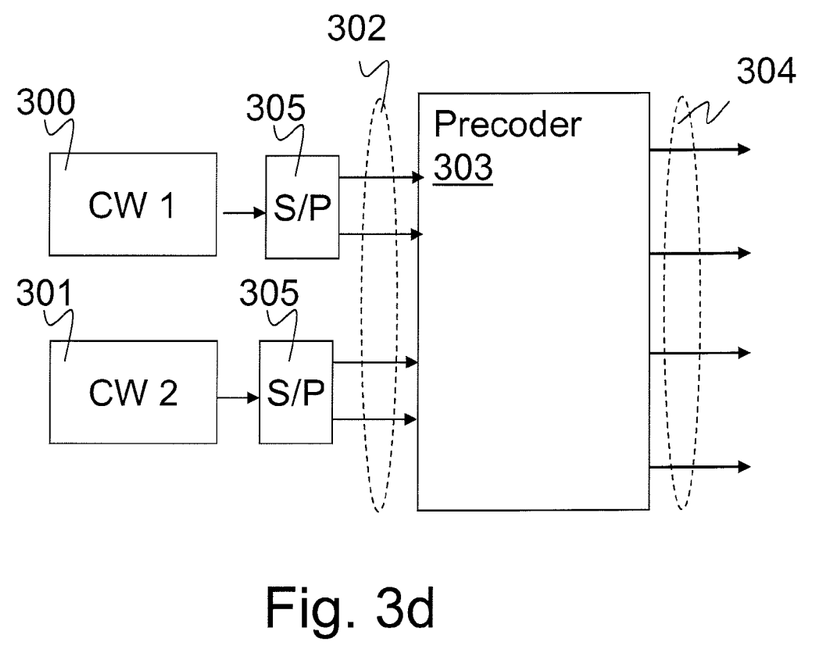

In a MIMO system employing spatial multiplexing it may make sense to transmit data from several HARQ processes at once, also known as multi-codeword transmission. Such use of separate HARQ processes allows retransmissions to be carried out independently on different layers and can in principle lead to better resource utilization. If a single HARQ process is used on the contrary, a single corresponding codeword is instead distributed over all layers. Hence different number of HARQ processes or independently coded codewords can be employed, and a compromise between the two extremes of a single codeword transmitted on all layers and separate codewords transmitted on each layer can be achieved. Such a compromise is exploited in the downlink of LTE where a number of fixed codeword to layer mappings are used. The fixed mappings in an LTE-system with four transmitting antennas and four receiving antennas are illustrated in FIGS. 3a-3d, for the four different transmission ranks. In FIG. 3a, the channel conditions only allow for one single layer 302, and it is only possible to map a first modulated codeword 300 onto this layer 302. In the pre-coder 303, the modulated codeword may be mapped to the four transmitting antennas 304. In FIG. 3b, the channel conditions allow for two layers 302. In this case multi-codeword transmission is possible, and a first codeword 300 is mapped onto one of the layers, and a second codeword 301 is mapped onto the second layer. In FIG. 3c, there are three layers 302. A first codeword 300 is mapped onto one of the layers, and a second codeword 301 is mapped onto both of the remaining layers by passing the codeword through a serial to parallel conversion device 305. In FIG. 3d, there are four layers 302, and a first codeword 300 is mapped onto two of the layers and a second codeword 301 onto the two remaining layers.

A problem with existing solutions for multi-codeword transmission (i.e. transmitting several separately coded blocks of information bits simultaneously) is that one ACK/NACK per codeword typically needs to be fed back from the receiver to the transmitter. This may substantially increase the signaling overhead since ACK/NACKs often have tough error rate requirements due to the importance to receive them correctly which makes them resource demanding.

To mitigate this problem, the known ACK/NACK compression technique of so-called ACK/NACK bundling may be used. ACK/NACK bundling means that one single ACK/NACK covers multiple blocks of information bits. Hence, all coded blocks of information bits or codewords within a bundled set of codewords need to be correctly received in order for an ACK to be sent. If one single codeword is erroneously received, a NACK will be sent and all blocks of information bits of the bundled set need to be retransmitted. A problem with the ACK/NACK bundling is thus the loss of performance due to the fact that blocks of information bits that are already received correctly are retransmitted. A significant performance loss in the order of one dB may occur in the case of two bundled codewords.

An alternative to ACK/NACK bundling is of course to use a single codeword transmission scheme. This automatically avoids the signaling overhead of multiple ACK/NACKs but suffers on the other hand from difficulties in finding advanced receiver architectures for non-linear processing with reasonable complexity. A SIC type of receiver can only be used with multi-codeword transmission, as already mentioned above.

SUMMARY

The object of the present invention is to achieve methods and arrangements that obviate some of the above disadvantages and enable the use of multi-codeword transmission with ACK/NACK compression, as well as advanced receivers of reasonable complexity, while keeping the performance loss due to the ACK/NACK compression low.

This is achieved by a solution based on the distribution of the symbols of separately coded blocks of information bits over the available physical resources before transmission. Each physical resource will thus carry a mixture of symbols from all blocks of information bits, which results in a more similar channel quality for the blocks of information bits. A compressed ACK/NACK message corresponding to the blocks of information bits will thus be more accurate and the performance loss due to the ACK/NACK compression is reduced.

In accordance with a second aspect of the present invention, a method in a wireless communication system of receiving and decoding multiple blocks of information bits, simultaneously transmitted from a transmitting device with HARQ over a radio channel comprising at least two physical resources is provided. The method comprises the steps, performed by a receiving device, of receiving symbols corresponding to at least two blocks of information bits on each physical resource, and retrieving a set of symbols corresponding to each of the blocks of information bits from the received symbols, assuming that each block of information bits has been distributed over all of the physical resources. It further comprises the steps of transforming each set of symbols to a codeword, and decoding each codeword to provide an estimate of each block of information bits. Each estimate of block of information bits is checked for errors and a compressed ACK/NACK message, compiled based on the result of the error checking in the estimates of block of information bits, is transmitted.

In accordance with a third aspect of the present invention, a transmitting device in a wireless communication system is provided. The transmitting device is adapted to transmit multiple blocks of information bits simultaneously to a receiving device with HARQ over a radio channel comprising at least two physical resources. The transmitting device comprises means for coding at least two blocks of information bits separately to obtain a codeword per block of information bits, and means for mapping each of the codewords to a set of modulation symbols. It further comprises means for distributing each set of modulation symbols over all of the physical resources, so that each physical resource carries a mixture of modulation symbols corresponding to the at least two blocks of information bits, and means for transmitting the modulation symbols carried by each physical resource simultaneously to the receiving device. The transmitting device also comprises means for receiving a compressed ACK/NACK message corresponding to the at least two blocks of information bits.

In accordance with a fourth aspect of the present invention, a receiving device in a wireless communication system is provided. The receiving device is adapted to receive and decode multiple blocks of information bits, simultaneously transmitted from a transmitting device with HARQ over a radio channel comprising at least two physical resources. The receiving device comprises means for receiving symbols corresponding to at least two blocks of information bits on each physical resource, and means for retrieving a set of symbols corresponding to each of the blocks of information bits from the received symbols, assuming that each block of information bits has been distributed over all of said physical resources. The receiving device further comprises means for transforming each set of symbols to a codeword, and means for decoding each codeword to provide an estimate of each block of information bits. It also comprises means for checking for errors in each estimate of block of information bits, and means for transmitting a compressed ACK/NACK message, compiled based on the result of the error checking in each estimate of block of information bits.

An advantage of embodiments of the present invention is that the typical loss of performance for ACK/NACK compression can be substantially reduced by mixing multiple codewords onto the physical resources in a uniform manner.

A further advantage of embodiments of the present invention is that they allow for the use of advanced receivers with reasonable complexity, such as SIC receivers.

Another advantage of embodiments of the present invention is that the latency in some cases also may decrease in comparison to the latency of a single codeword transmission, since the receiver knows which blocks of information bits that were correctly decoded and can pass them along even though they are retransmitted.

DETAILED DESCRIPTION

In the following, the invention will be described in more detail with reference to certain embodiments and to accompanying drawings. For purposes of explanation and not limitation, specific details are set forth, such as particular scenarios, techniques, etc., in order to provide a thorough understanding of the present invention. However, it will be apparent to one skilled in the art that the present invention may be practised in other embodiments that depart from these specific details.

Moreover, those skilled in the art will appreciate that the functions and means explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as in a system comprising a computer processor and a memory coupled to the processor, wherein the memory is encoded with one or more programs that may perform the functions disclosed herein.

The present invention is described herein by way of reference to particular example scenarios. In particular the invention is described in a non-limiting general context in relation to a 3GPP LTE system. It should though be noted that the invention and its exemplary embodiments may also be applied to other types of radio access technologies such as UMTS, WiMax, Ultra Mobile Broadband (UMB) and GSM.

In the present invention, the problem of the ACK/NACK compression performance loss is addressed by a solution based on the distribution of symbols from separately coded blocks of information bits over the available physical resources before transmission. Each physical resource will thus carry a mixture of symbols from all blocks of information bits, which results in that the blocks of information bits will see a more similar channel quality than if each block was transmitted on a separate physical resource. A compressed ACK/NACK message corresponding to the blocks of information bits will thus be more relevant and the performance loss due to the ACK/NACK compression is therefore reduced.

An alternative to using ACK/NACK compression is to use single codeword transmission, but as explained previously single codeword transmission makes it impossible to use advanced receivers of reasonable complexity, such as the SIC receiver. The present invention thus makes it possible to use multi-codeword transmission with reduced signaling overhead through ACK/NACK compressions without excessive performance loss. The use of multi-codeword transmission also allows for the use of a SIC receiver.

In one embodiment of the present invention, the distribution of the symbols from each of the blocks of information bits should be done as evenly as possible, as the purpose is to get a similar channel quality for the different blocks.

In a first embodiment of the present invention, the wireless communication system uses pre-coded spatial multiplexing, and the physical resources thus correspond to the layers. In this embodiment, two or more blocks of information bits are coded separately. These codewords are then modulated, and the modulation symbols of each coded block of information bits are distributed over the different layers so that each layer carries a mixture of symbols from all of the coded blocks of information bits. This will in turn result in an improved compressed ACK/NACK message, as the blocks of information bits will see a similar channel quality. With a similar channel quality it is more probable that either all blocks are received correctly or all blocks are received incorrectly, making a compressed ACK/NACK more appropriate.

In a second embodiment, the wireless communication system uses multi-carrier, and the physical resources then correspond to carriers. In this second embodiment, the symbols of each codeword is distributed across the different carriers instead of layers. A combination of a distribution over layers and carriers is also possible. Separate decoding will then keep the decoding complexity at a reasonable complexity.

In order to describe the present invention in more details, an exemplary embodiment of the present invention is described. In this embodiment the wireless communication system considered is an LTE system with spatial multiplexing, according to the first embodiment above. Orthogonal Frequency Division Multiplexing (OFDM) has been adopted as the transmission scheme for the downlink radio interface in 3GPP LTE. OFDM is a frequency-division multiplexing scheme utilized as a digital multi-carrier modulation method. A large number of closely-spaced orthogonal sub-carriers are used to carry data. The data is divided into several parallel data streams or channels, one for each sub-carrier. Each sub-carrier is modulated with a conventional modulation scheme at a low symbol rate, maintaining total data rates similar to conventional single-carrier modulation schemes in the same bandwidth. To be a bit more specific, a variant of OFDM, namely Orthogonal Frequency Division Multiple Access (OFDMA), is used for 3GPP LTE downlink transmission and allows different users to be multiplexed on different sets of sub-carriers. The uplink in 3GPP LTE is based on Singe Carrier Frequency Division Multiplexing (SC-FDMA), which also can be regarded as DFT (Discrete Fourier Transform) spread OFDM (DFTS-OFDM). In DFTS-OFDM, time domain information carrying signals are passed through a discrete Fourier transform (DFT) and are then mapped onto consecutive subcarriers at the input of an inverse DFT (IDFT). A cyclic prefix is added to the output of the IDFT and the signals are then transformed into time-continuous signals and transmitted over the radio channel.

Figure 4:
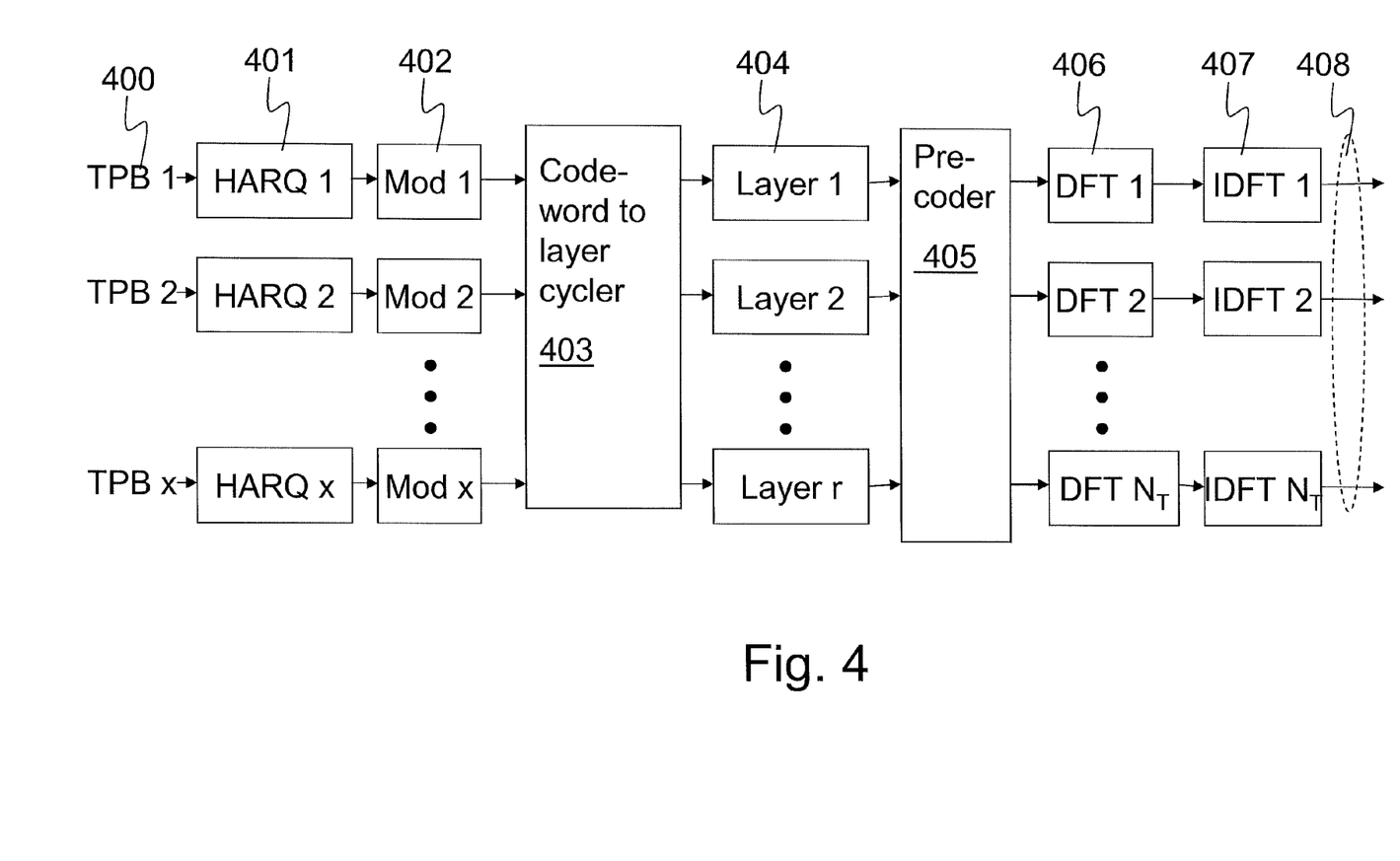
FIG. 4 illustrates schematically the codeword mixing in a transmitting device employing pre-coded spatial multiplexing in SC-OFDMA according to one embodiment of the present invention.
Figure 5:
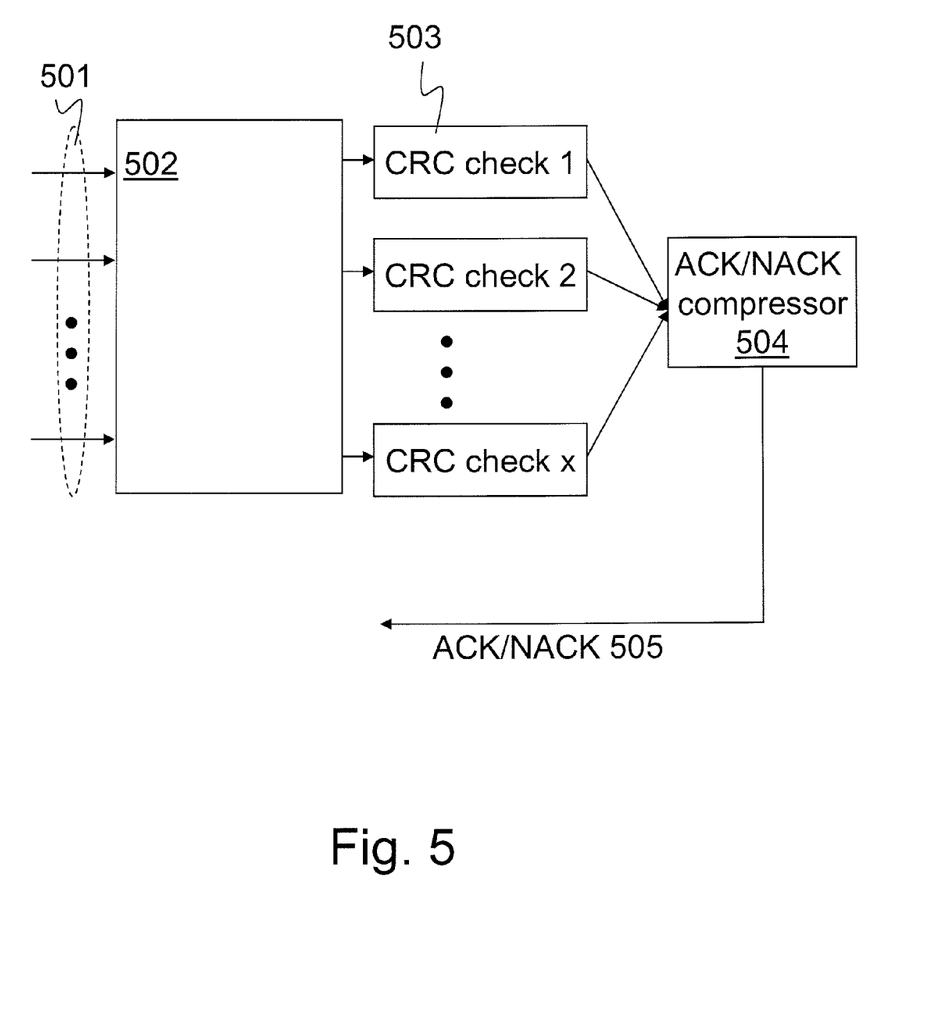
FIG. 5 illustrates schematically a receiving device, receiving the signals transmitted by the transmitting device of FIG. 4, and the ACK/NACK compression according to one embodiment of the present invention.

In this exemplary embodiment illustrated in FIGS. 4 and 5, uplink transmission is considered. However, the present invention is also applicable for downlink transmission. Although the current 3GPP standard does not support spatial multiplexing on the uplink in LTE, a possible design for the transmitting device in the UE is illustrated in FIG. 4. We see that x blocks of information bits 400 can be simultaneously transmitted. Each block 400 is passed through a HARQ functionality device 401 which may include CRC attachment, code block segmentation, channel coding (e.g. turbo coding), rate matching, retransmission functionality etc. The output of this device 401 consists of coded bits related to the corresponding block of information bits, i.e. a codeword. The codeword is mapped onto a set of modulation symbols 402 and these symbols are passed through a codeword to layer cycler 403 which makes sure that the symbols of each codeword is distributed closed to evenly over the layers. One way of achieving that is to let the symbol s on layer r' at time index k be $$s_k^{(r')} = c^{(mod(k,r))}\left(\left\lfloor \frac{k}{r} \right\rfloor r + r'\right) \quad (2)$$

Where $c^{(m)}(n)$ is the n:th symbol in the m:th codeword. This corresponds to passing the codeword symbols through a serial to parallel conversion (S/P) device and then connecting one output from each S/P device to each layer 404. Each layer 404 thus gets codeword symbols from each codeword and hence contains an, at least close to, uniform mixture of all the codewords. The symbols on each layer 404 are pre-coded 405 in either a channel dependent or channel independent manner. The pre-coded signals are converted to a frequency domain signal by the DFT 406, placed at certain subcarriers and then converted back to the time domain by means of IDFT 407, before being transmitted via the transmitting antennas 408. Eventually, the UE will receive a compressed ACK/NACK message fed back from the receiving device (illustrated in FIG. 5) corresponding to the x blocks of information bits. This compressed ACK/NACK message, determines if the blocks should be retransmitted or not.

The receiving device—in this embodiment placed in an RBS—is illustrated in FIG. 5. Signals are received over multiple receiving antennas 501. As the receiving device can assume what operations the transmitting device has done before transmitting, it performs the inverse operations of the transmitting device in the receiver and decoder 502. In particular, the operations of the codeword to layer mixer are inversed to obtain codewords corresponding to each simultaneously transmitted block of information bits. The codewords are then decoded. The decoding gives an estimate of the blocks of information bits, comprising an error-detecting code, e.g. a CRC. The CRC of each block estimate are checked 503 in order to detect errors. In one embodiment of the present invention, a SIC receiver is used. In such a receiver, the CRC of the first decoded block of information bits is checked, and if the check is positive the contribution of the correctly decoded block is removed from the received signals. This is iterated (as described above) and based on the results of all the x CRC checks, a compressed ACK/NACK feedback message 505 is compiled and can be returned to the UE.

In one embodiment of the present invention, the ACK/NACK compression can be the simple ACK/NACK bundling previously described. However, the ACK/NACK compression can also take other forms, such as feeding back the highest index of the block of information bits for which all blocks with a lower index has a CRC that resulted in a positive error check.

In the exemplary embodiment of uplink transmission in an LTE system with spatial multiplexing described above, the approximately even distribution of the codeword symbols over the different layers is done according to the mathematical expression in (2). This distribution may however be accomplished in a number of ways, and three alternative embodiments cover distribution through large delay CDD (Cyclic Delay Diversity), layer cycling or HARQ to codeword cycling. In the layer cycling, the symbols of a codeword are cyclically shifted to a different layer from time to time, in order to evenly distribute the symbols of each codeword onto the different layers. The large delay CDD involves not only a shifting of symbols, but also a transformation of the symbols. HARQ to codeword cycling is similar to layer cycling but cycles the mapping of the HARQ to a codeword so that a single codeword will contain roughly equal proportion of information from all blocks of information bits. This is essentially a redefinition of the term codeword but it accomplishes the overall goal of evenly distributing each block of information bits onto all the layers. Other forms of interleaving are also possible. In the multi-carrier system embodiment described above, the distribution of the codeword symbols is achieved through e.g. carrier cycling.

As mentioned above with reference to FIG. 4, the HARQ functionality device 401 includes among other things the channel coding, e.g. the turbo coding. The turbo coder will not code the entire block of information bits at the same time, but will instead code a part of the block at a time, resulting in a codeblock. The final codeword will thus comprise a number of codeblocks. When distributing the symbols of a codeword onto the different layers, it is important to ensure that each codeblock of a codeword is distributed over the layers. Furthermore, CRCs can be attached to each codeblock within a codeword so that the latency of the SIC decoding can be decreased by performing SIC separately on a group of codeblocks at a time.

A fixed codeword to layer mapping such as the one illustrated in FIG. 3*a-d* may also be employed in conjunction with the codeword to layer cycling of the present invention. In the codeword to layer mapping in for example FIG. 3*d*, the codeword to layer cycling would only be needed among the layers belonging to different codewords. In FIG. 3*d* a first codeword 300 is mapped onto layer one and two, and a second codeword 301 is mapped onto layer 3 and 4. It is then important to distribute the symbols of the first codeword onto layer 3 and 4, and vice versa for the second codeword. On the other hand, it is not so important to shift between layer 1 and 2 for the first codeword (or between layer 3 and 4 for the second).

Figure 6A:
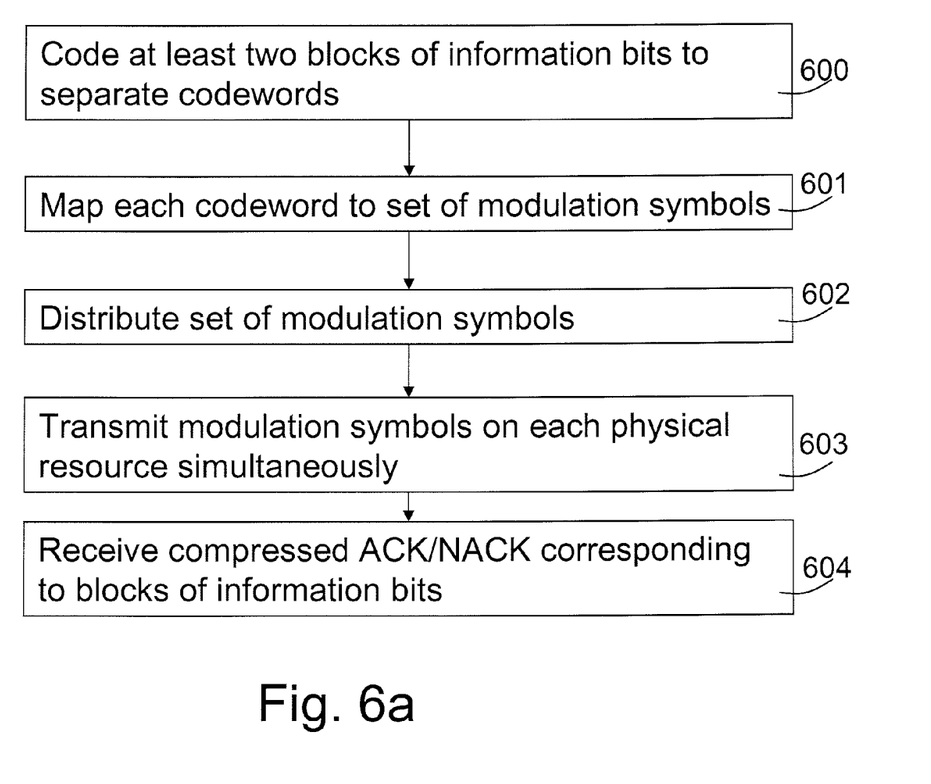
FIGS. 6a and 6b are flowcharts of the methods according to embodiments of the present invention.

FIG. 6*a* is a flowchart for the method of the transmitting device, according to one embodiment of the present invention. It comprises the following steps:

600: Code at least two blocks of information bits separately, in order to obtain a codeword per block of information bits.

601: Each codeword is then mapped to a corresponding set of modulation symbols.

602: Each set of modulation symbols is distributed over all of the physical resources, so that each physical resource carries a mixture of modulation symbols from all of the blocks of information bits. The distribution can be done in different ways, as long as there is an approximately even distribution of the symbols associated with each block of information bits over all physical resources. The physical resources may be either layers (the spatial multiplexing case) or carriers (the multi-carrier case).

603: The modulation symbols carried by each physical resource are transmitted simultaneously to the receiving device.

604: Eventually, a compressed ACK/NACK message, such as a bundled ACK/NACK message corresponding to the blocks of information bits, is returned from the receiving device. This message decides if the blocks are to be retransmitted (NACK) or not (ACK).

Figure 6B:
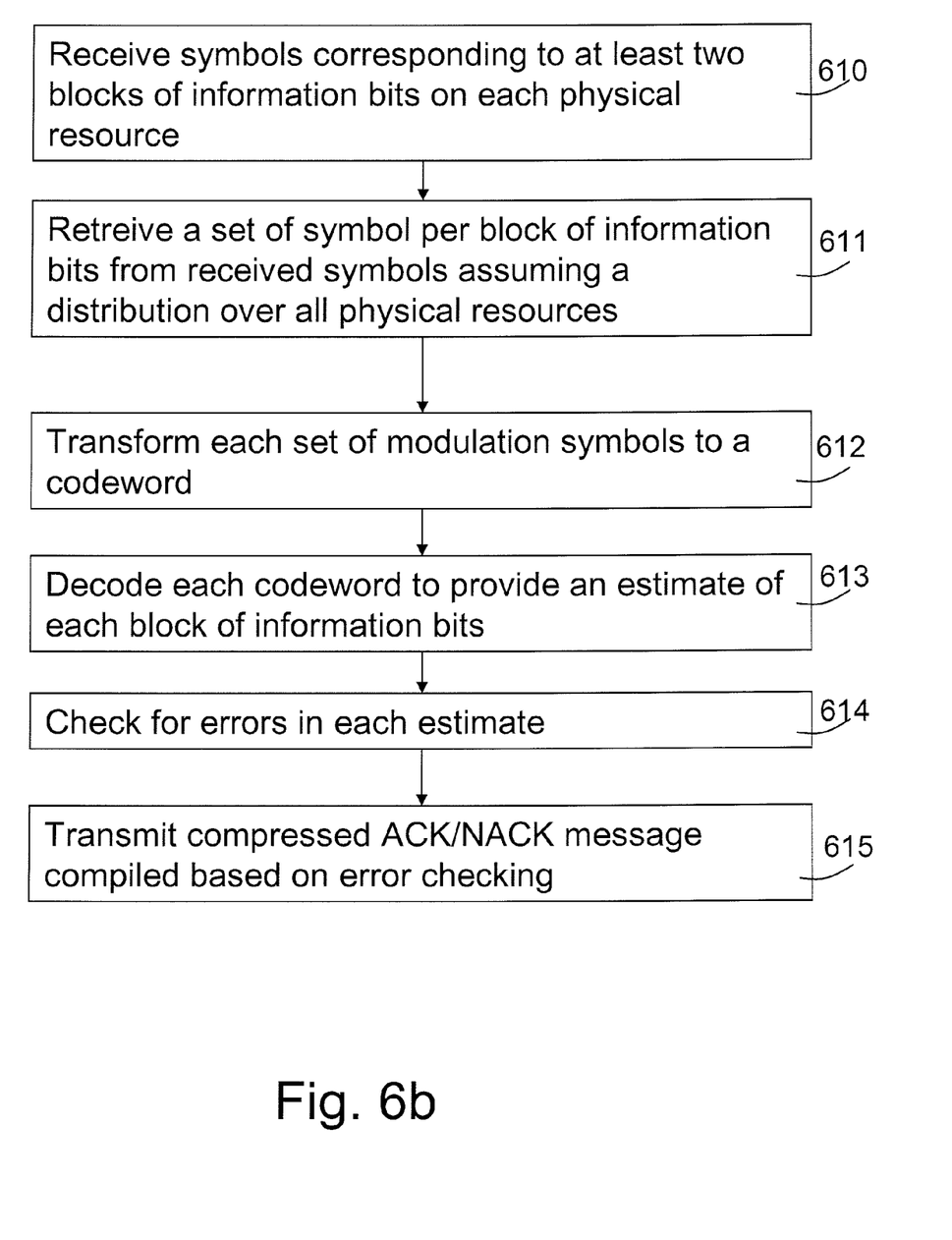

Furthermore, FIG. 6*b* is a flowchart for the method of the receiving device, according to one embodiment of the present invention. It comprises the following steps:

610: Symbols corresponding to at least two blocks of information bits are received on each physical resource.

611: A set of symbols corresponding to each block of information bits are retrieved from the received symbols. This is done based on an assumption that the symbols corresponding to each block of information bits have been distributed in an approximately even manner over all of the physical resources by the transmitting device, as described above with reference to FIG. 6*a*.

612: Each set of symbols are transformed to a codeword.

613: Each codeword is decoded to provide an estimate of each block of information bits.

614: A check for errors is done in each estimate, using an error-detection code such as CRC.

615: A compressed ACK/NACK message, compiled based on the result of the error checking for each of the estimates, is fed back to the transmitting device. The compressed ACK/NACK message could e.g. be a bundled ACK/NACK message.

Figure 7:
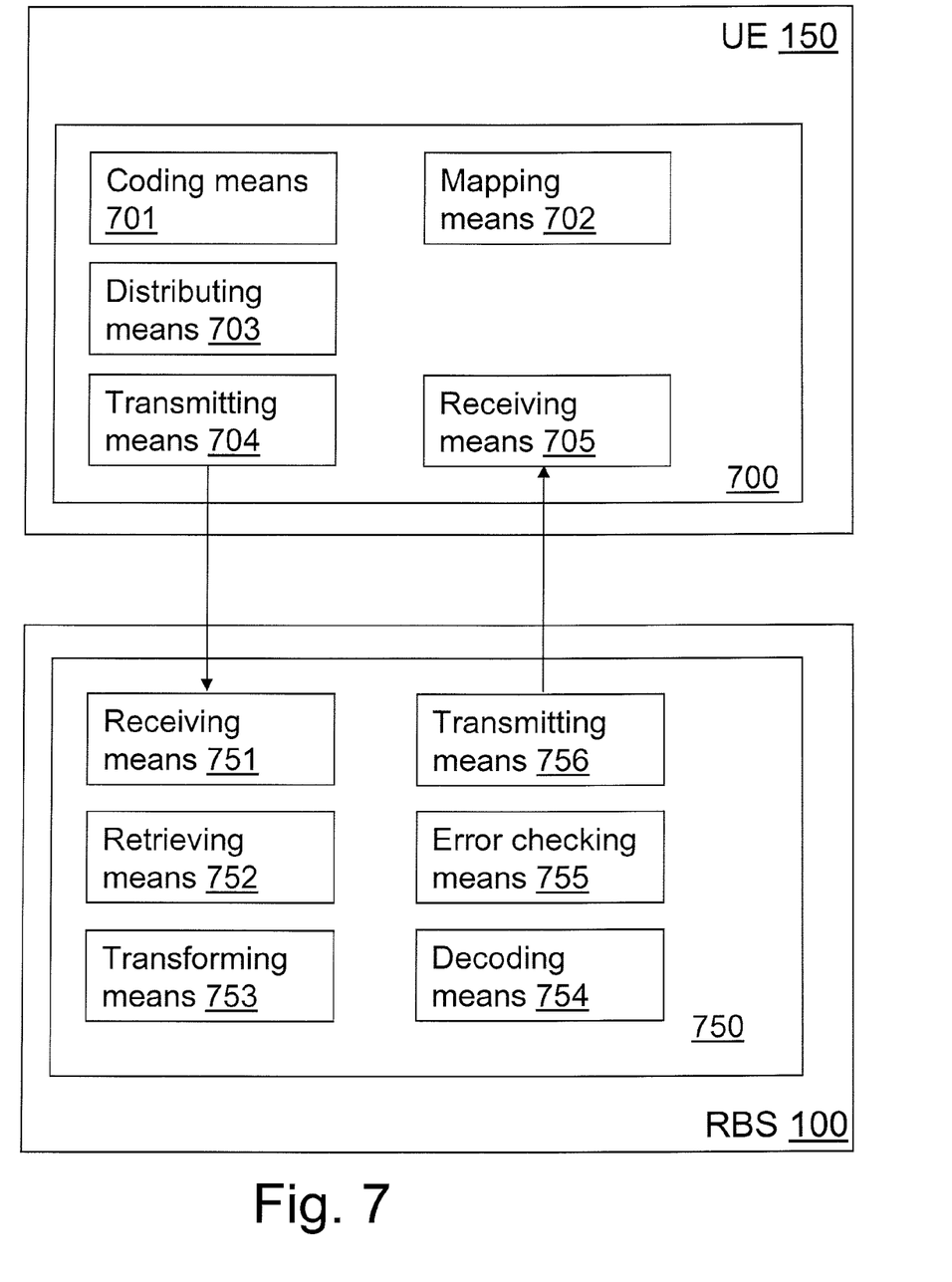
FIG. 7 illustrates schematically the transmitting and receiving devices according to embodiments of the present invention.

Schematically illustrated in FIG. 7 and according to one embodiment of the present invention, is the transmitting device 700 placed in a UE 150. It comprises coding means 701 for coding at least two blocks of information bits separately to obtain a codeword per block of information bits, and means for mapping 702 each of the codewords to a set of modulation symbols. It further comprises distributing means 703 for distributing each set of modulation symbols over all of the physical resources, so that each physical resource carries an approximately even mixture of modulation symbols corresponding to the blocks of information bits. It also comprises means for transmitting 704 the modulation symbols carried by each physical resource simultaneously to the receiving device, and means for receiving 705 a compressed ACK/NACK message corresponding to the blocks of information bits from the receiving device 750 in the RBS 100.

Also illustrated in FIG. 7 and according to one embodiment of the present invention, is the receiving device 750 placed in an RBS 100. It comprises receiving means 751 for receiving symbols corresponding to at least two blocks of information bits on each physical resource, and means for retrieving 752 a set of symbols corresponding to each of the blocks of information bits from the received symbols based on an assumption that the symbols corresponding to each block of information bits have been distributed over all of the physical resources by the transmitting device. It further comprises means for transforming 753 each set of symbols to a codeword, and means for decoding 754 each codeword to provide an estimate of each block of information bits. It also comprises means for checking for errors 755 in each estimate of block of information bits, and means for transmitting 756 a compressed ACK/NACK message, compiled based on the result of the error checking in each estimate of block of information bits, to the transmitting device 700.

It should be noted that it is an uplink scenario that is illustrated in FIG. 7. However, the present invention is applicable to both uplink and downlink, which implies that an RBS and a UE may comprise both the transmitting device and the receiving device, if both the uplink and the downlink uses the present invention.

The means illustrated in FIG. 7 may be implemented by physical or logical entities using software functioning in conjunction with a programmed microprocessor or general purpose computer, and/or using an application specific integrated circuit (ASIC).

The above mentioned and described embodiments are only given as examples and should not be limiting to the present invention. Other solutions, uses, objectives, and functions within the scope of the invention as claimed in the accompanying patent claims should be apparent for the person skilled in the art.

| ABBREVIATIONS | |
|---|---|
| 3GPP | 3$^{rd}$ Generation Partnership Project |
| ACK | Acknowledgement |
| ASIC | Application Specific Integrated Circuit |
| CDD | Cyclic Delay Diversity |
| CRC | Cyclic Redundancy Check |
| DFT | Discrete Fourier Transform |
| DFTS-OFDM | DFT Spread OFDM |
| E-UTRAN | Evolved UTRAN |
| FDD | Frequency Division Duplex |
| FEC | Forward Error Correction |
| HARQ | Hybrid Automatic Repeat request |
| IDFT | Inverse DFT |
| LTE | Long Term Evolution |
| MIMO | Multiple-Input Multiple-Output |
| NACK | Negative Acknowledgement |
| OFDM | Orthogonal Frequency Division Multiplexing |
| OFDMA | Orthogonal Frequency Division Multiple Access |
| RBS | Radio Base Station |
| SC-FDMA | Singe Carrier Frequency Division Multiple Access |
| SIC | Successive Interference Cancellation |
| TPB | Transport Block |
| UE | User Equipment |
| UMB | Ultra Mobile Broadband |
| UMTS | Universal Mobile Telecommunication System |
| UTRAN | UMTS Terrestrial Radio Access Network |

The invention claimed is:

1. A method that is performed by a transmitting device in a wireless communication system for transmitting multiple blocks of information bits simultaneously to a receiving device with hybrid automatic repeat request (HARQ) over a radio channel comprising at least two physical resources, said method comprising:
   coding at least two blocks of information bits separately to obtain one codeword per block of information bits;
   mapping each of the codewords to a corresponding set of modulation symbols;
   distributing each set of modulation symbols over the at least two physical resources, so that each physical resource carries a mixture of modulation symbols corresponding to the at least two blocks of information bits;
   transmitting the modulation symbols carried by each physical resource simultaneously to the receiving device; and
   receiving a compressed positive acknowledgement (ACK) or negative acknowledgement (NACK) message corresponding to the at least two blocks of information bits that were separately coded to obtain one codeword per block of information bits,
   wherein the distributing comprises pre-coded spatial multiplexing and said physical resources corresponds to layers,
   wherein during the distributing each set of modulation symbols over the at least two physical resources comprises using large delay Cyclic Delay Diversity (CDD), layer cycling, or HARQ to codeword cycling,
   wherein the layer cycling comprises shifting the modulation symbols of a codeword cyclically to a different physical resource from one transmission time to another transmission time, to approximately evenly distribute the modulation symbols of each codeword onto the different physical resources,
   wherein the large delay CDD includes transformation of the modulation symbols, and
   wherein the HARQ to codeword cycling includes cycling mapping of the HARQ to a codeword such that a single codeword will contain approximately equal proportion of information from all blocks of information bits.

2. The method according to claim 1, wherein in the step of distributing, each set of modulation symbols are approximately evenly distributed over all of said physical resources.

3. The method according to claim 2, wherein the step of distributing comprises using multi-carriers and said physical resources correspond to carriers.

4. The method according to claim 1, further comprising using channel dependent pre-coded spatial multiplexing.

5. The method according to claim 1, wherein the received compressed ACK or NACK message is a bundled ACK or NACK message compiled based on a result of error checking corresponding to the at least two blocks of information bits.

6. The method according to claim 1, wherein the wireless communication system is an E-UTRAN system and the transmitting device is within a user equipment that uses discrete Fourier transform (DFT) spread Orthogonal Frequency Division Multiplexing (OFDM) for the transmission.

7. A method that is performed by a receiving device in a wireless communication system for receiving and decoding multiple blocks of information bits, simultaneously transmitted from a transmitting device with hybrid automatic repeat request (HARQ) over a radio channel comprising at least two physical resources, said method comprising:
   receiving symbols corresponding to at least two blocks of information bits on each physical resource;
   retrieving a set of symbols corresponding to each of said blocks of information bits from the received symbols, where each block of information bits has been distributed over the at least two physical resources;
   transforming each set of symbols to a codeword;
   decoding each codeword to provide an estimate of each block of information bits;
   checking for errors in each estimate of block of information bits; and
   transmitting a compressed positive acknowledgement (ACK) or negative acknowledgement (NACK) message, compiled based on the result of the error checking in each estimate of block of information bits,
   wherein the information bits are received with pre-coded spatial multiplexing and said physical resources corresponds to layers,
   wherein the retrieving comprises retrieving a set of symbols corresponding to each of said blocks of information bits from the received symbols, where each block of information bits has been substantially evenly distributed over all of said layers by using large delay Cyclic Delay Diversity (CDD), layer cycling, or HARQ to codeword cycling, wherein the layer cycling comprises shifting the modulation symbols of a codeword cyclically to a different physical resource from one transmission time to another transmission time, to approximately evenly distribute the modulation symbols of each codeword onto the different physical resources, wherein the large delay CDD includes transformation of the modulation symbols, and wherein the HARQ to codeword cycling includes cycling mapping of the HARQ to a codeword such that a single codeword will contain approximately equal proportion of information from all blocks of information bits.

8. The method according to claim 7, wherein channel dependent pre-coded spatial multiplexing is used.

9. The method according to claim 7, wherein the wireless communication system uses multi-carrier and said physical resources corresponds to carriers.

10. The method according to claim 7, wherein the received compressed ACK or NACK message is a bundled ACK or NACK message compiled based on a result of error checking in each estimate block of information bits.

11. The method according to claim 7, wherein the receiving device uses a successive interference cancellation, SIC, receiver.

12. A transmitting device in a wireless communication system, the transmitting device is adapted to transmit multiple blocks of information bits simultaneously to a receiving device with hybrid automatic repeat request (HARQ) over a radio channel comprising at least two physical resources, said transmitting device comprising:

circuitry for coding at least two blocks of information bits separately to obtain a codeword per block of information bits;

circuitry for mapping each of the codewords to a set of modulation symbols;

circuitry for distributing each set of modulation symbols over all of said physical resources, so that each physical resource carries a mixture of modulation symbols corresponding to the at least two blocks of information bits;

circuitry for transmitting the modulation symbols carried by each physical resource simultaneously to the receiving device; and circuitry for receiving a compressed positive acknowledgement (ACK) or negative acknowledgement (NACK) message corresponding to the at least two blocks of information bits that were separately coded to obtain one codeword per block of information bits, wherein the circuitry for distributing uses pre-coded spatial multiplexing and said physical resources corresponds to layers, wherein the circuitry for distributing is further configured to use large delay Cyclic Delay Diversity (CDD), layer cycling, or HARQ to codeword cycling, wherein the layer cycling comprises shifting the modulation symbols of a codeword cyclically to a different physical resource from one transmission time to another transmission time, to approximately evenly distribute the modulation symbols of each codeword onto the different physical resources, wherein the large delay CDD includes transformation of the modulation symbols, and wherein the HARQ to codeword cycling includes cycling mapping of the HARQ to a codeword such that a single codeword will contain approximately equal proportion of information from all blocks of information bits.

13. The transmitting device according to claim 12, wherein the circuitry for distributing is further configured to approximately evenly distribute each set of modulation symbols over all of said physical resources.

14. The transmitting device according to claim 13, wherein the circuitry for distributing uses multi-carrier and said physical resources corresponds to carriers.

15. The transmitting device according to claim 12, wherein the circuitry for distributing uses channel dependent pre-coded spatial multiplexing.

16. The transmitting device according to claim 12, wherein the compressed ACK or NACK message is a bundled ACK or NACK message.

17. The transmitting device according to claim 12, wherein the transmitting device is within a user equipment.

18. The transmitting device according to claim 17, wherein the wireless communication system is an E-UTRAN system and the transmitting device receives discrete Fourier transform (DFT) spread Orthogonal Frequency Division Multiplexing (OFDM) signals.

19. The transmitting device according to claim 12, wherein the transmitting device is within-a radio base station.

20. A user equipment in a wireless communication system, comprising a transmitting device according to claim 12.

21. A receiving device in a wireless communication system, the receiving device is adapted to receive and decode multiple blocks of information bits, simultaneously transmitted from a transmitting device with hybrid automatic repeat request (HARQ) over a radio channel comprising at least two physical resources, said receiving device comprising:

circuitry for receiving symbols corresponding to at least two blocks of information bits on each physical resource;

circuitry for retrieving a set of symbols corresponding to each of said blocks of information bits from the received symbols, where each block of information bits has been distributed over all of said physical resources;

circuitry for transforming each set of symbols to a codeword;

circuitry for decoding each codeword to provide an estimate of each block of information bits;

circuitry for checking for errors in each estimate of block of information bits; and circuitry for transmitting-a compressed positive acknowledgement (ACK) or negative acknowledgement (NACK) message, compiled based on the result of the error checking in each estimate of block of information bits, wherein the wireless communication system uses pre-coded spatial multiplexing and said physical resources corresponds to layers, wherein the circuitry for retrieving is further configured to retrieve a set of symbols corresponding to each of said blocks of information bits from the received symbols, where each block of information bits has been substantially evenly distributed over all of said physical resources by using large delay Cyclic Delay Diversity (CDD), layer cycling, or HARQ to codeword cycling, wherein the layer cycling comprises shifting the modulation symbols of a codeword cyclically to a different physical resource from one transmission time to another transmission time, to approximately evenly distribute the modulation symbols of each codeword onto the different physical resources, wherein the large delay CDD includes transformation of the modulation symbols, and wherein the HARQ to codeword cycling includes cycling mapping of the HARQ to a codeword such that a single codeword will contain approximately equal proportion of information from all blocks of information bits.

22. The receiving device according to claim 21 wherein channel dependent pre-coded spatial multiplexing is used.

23. The receiving device according to claim 21, wherein the wireless communication system uses multi-carrier and said physical resources correspond to carriers.

24. The receiving device according to claim 21, wherein the compressed ACK or NACK message is a bundled ACK or NACK message.

25. The receiving device according to claim 21, further comprising a successive interference cancellation, SIC, receiver.

26. The receiving device according to claim 21, wherein the receiving device is within a user equipment.

27. The receiving device according to claim 21, wherein the receiving device is within a radio base station.

28. A radio base station in a wireless communication system, comprising a receiving device according to claim 21.

* * * * *